US012541487B2

(12) United States Patent
Umashankar et al.

(10) Patent No.: US 12,541,487 B2
(45) Date of Patent: Feb. 3, 2026

(54) METHOD FOR CONSTRUCTING DATABASE, METHOD FOR RETRIEVING DOCUMENT AND COMPUTER DEVICE

(71) Applicant: PATSNAP LIMITED, Suzhou (CN)

(72) Inventors: Shivshankar Umashankar, Suzhou (CN); Pankaj Kumar, Suzhou (CN); Markus Haense, Suzhou (CN)

(73) Assignee: PATSNAP LIMITED, Suzhou (CN)

( * ) Notice: Subject to any disclaimer, the term of this patent is extended or adjusted under 35 U.S.C. 154(b) by 408 days.

(21) Appl. No.: 17/696,737

(22) Filed: Mar. 16, 2022

(65) Prior Publication Data
US 2022/0229820 A1 Jul. 21, 2022

Related U.S. Application Data

(63) Continuation of application No. PCT/CN2020/113214, filed on Sep. 3, 2020.

(30) Foreign Application Priority Data

Sep. 18, 2019 (CN) .......................... 201910881925.4

(51) Int. Cl.
*G06F 16/21* (2019.01)
*G06F 16/9038* (2019.01)
*G06F 16/93* (2019.01)

(52) U.S. Cl.
CPC ........ *G06F 16/211* (2019.01); *G06F 16/9038* (2019.01); *G06F 16/93* (2019.01); *G06F 2216/11* (2013.01)

(58) Field of Classification Search
CPC .... G06F 16/211; G06F 16/9038; G06F 16/93; G06F 2216/11; G06F 16/338;
(Continued)

(56) References Cited

U.S. PATENT DOCUMENTS 6,636,849 B1 * 10/2003 Tang ................... G06F 16/2246
707/999.005
6,941,317 B1 * 9/2005 Chamberlin ........... G16B 50/30
435/6.12
(Continued)

FOREIGN PATENT DOCUMENTS

CN 1684071 A 10/2005
CN 105740243 A * 7/2016
(Continued)

OTHER PUBLICATIONS

Anonymous, OCR to Database, retrieved from the Internet: http://web.archive.org/web/20170412184241/https://ocrsolution.com/ocr-solutions/ocr-database/ on Oct. 27, 2022, published on Apr. 12, 2017.
(Continued)

*Primary Examiner* — Sheree N Brown
(74) *Attorney, Agent, or Firm* — Westbridge IP LLC

(57) ABSTRACT

Disclosed are a method for constructing a database, a method for labeling an association degree of biological sequences, a method for retrieving a document, and a computer device. In the solution of this application, a biological sequence and attribute information are extracted from a target document, and an entry in a database is constructed based on the extracted biological sequence and the attribute information. When a user conducts retrieval based on the database, a server can match an entry for the user by means of the biological sequence and the attribute information in the entry or a combination of the two. Therefore, when applied to a retrieval platform, the database of this application can provide the user with various types of retrieval support, such as biological sequence retrieval, biological sequence attribute retrieval, and comprehensive
(Continued)

biological sequence and biological sequence attribute retrieval, and the like.

13 Claims, 15 Drawing Sheets

(58) Field of Classification Search
CPC ..... G06F 16/353; G06F 16/148; G16B 45/00; G16B 50/30; G16H 70/00
USPC ........................................................ 707/722
See application file for complete search history.

(56) References Cited

U.S. PATENT DOCUMENTS

| | | | |
|---|---|---|---|
| 7,623,997 B2* | 11/2009 | Malanoski | G16B 30/10 703/2 |
| 2003/0054394 A1* | 3/2003 | Chin | G16B 40/20 435/6.12 |
| 2005/0240352 A1* | 10/2005 | Liang | G16B 50/10 702/19 |
| 2006/0224328 A1* | 10/2006 | Kim | G16H 70/00 702/20 |
| 2007/0059728 A1* | 3/2007 | Malanoski | G16B 30/00 435/6.12 |
| 2015/0039614 A1* | 2/2015 | Daly | G16B 30/00 707/756 |
| 2015/0331993 A1* | 11/2015 | Godbold | G06N 5/022 706/12 |
| 2017/0220650 A1 | 8/2017 | Tsai | |
| 2021/0004526 A1* | 1/2021 | Kahn | G06F 16/84 |
| 2021/0057099 A1* | 2/2021 | Neumann | G16H 50/20 |
| 2022/0229862 A1* | 7/2022 | Kappel | G16H 30/20 |

FOREIGN PATENT DOCUMENTS

| | | |
|---|---|---|
| CN | 106547756 A | 3/2017 |
| CN | 107168966 A | 9/2017 |
| CN | 110246590 A | 9/2019 |

OTHER PUBLICATIONS

Extended European Search Report issued in counterpart European Patent Application No. 20865284.2, dated Sep. 19, 2022.
International Search Report issued in corresponding PCT Application No. PCT/CN2020/113214, dated Nov. 24, 2020.
Written Opinion issued in corresponding PCT Application No. PCT/CN2020/113214, dated Nov. 24, 2020.

* cited by examiner

FIG. 5

METHOD FOR CONSTRUCTING DATABASE, METHOD FOR RETRIEVING DOCUMENT AND COMPUTER DEVICE

CROSS-REFERENCE TO RELATED APPLICATIONS

The present application is a continuation application of International Application No. PCT/CN2020/113214 filed on Sep. 3, 2020, which claims priority to Chinese Patent Application No. 201910881925.4 filed on Sep. 18, 2019. Both applications are incorporated herein by reference in their entireties.

TECHNICAL FIELD

This application relates to the technical field of natural language processing, and in particular, to a method for constructing a database, a method and a system for labeling an association degree of biological sequences, a method for retrieving a document, a computer device and a storage medium.

BACKGROUND

Biological sequences in patent documents are generally represented in a form of letter strings or sequence numbers. These biological sequences are generally used to describe major molecular structures of DNA, RNA, other nucleotides and proteins and express the genetic information carried.

In most cases, biological sequences in claims may generally be claimed in three ways:
1. Protection is claimed based on a structure of a biological sequence itself. By claiming protection in this way, if relevant evidence may be provided based on the detailed description of the embodiments, the protection scope claimed by the claims may be extended to achieve a certain similarity percentage (homology) with the claimed sequence.
2. Protection is claimed based on an origin, a function and an inclusion of a biological sequence.
3. Protection is claimed based on a product (especially a drug) that a biological sequence plays a role.

Due to the particularity of the expression of biological sequences in patent documents, it is extremely difficult for users to search for technologies in this field. Especially in patentability or novelty search, anti-infringement search or free-to-use (FTO) search, pre-achieved patentability search, and validity or invalidity search, the performance of traditional search and search methods are difficult to meet expectations of users.

SUMMARY

Based on this, it is necessary to provide a method and an apparatus for constructing a database, a method and a system for labeling an association degree of biological sequences, a method and an apparatus for retrieving a document, a computer device and a storage medium for the above technical problems.

In a first aspect, this application provides a method for constructing a biological sequence database, and the method includes:
  obtaining a target document;
  extracting a biological sequence and attribute information in the target document;
  associating a document identifier of the target document with a corresponding biological sequence and the attribute information to obtain an entry; and
  constructing a database using the entry.

In a second aspect, this application provides a method for labeling an association degree of gene sequences, the method includes:
  outputting a relevant biological sequence including at least one attribute according to a database and attribute information; and
  labeling a relevancy dimension of each of the relevant gene sequences according to an associated number of each of the relevant gene sequences and the attribute information.

In a third aspect, this application provides a method for retrieving a document, and the method includes:
  receiving retrieval information;
  matching at least one candidate entry for the retrieval information from a database constructed by the method for constructing the database according to any of the embodiments of this application; and
  obtaining a retrieval result according to the candidate entry In a fourth aspect, this application provides an apparatus for constructing a database, including:
  a feature extracting module configured to obtain a target document and extract a biological sequence and attribute information in the target document;
  an associating module configured to associate a document identifier of the target document with a corresponding biological sequence and the attribute information to obtain an entry; and
  a storage module configured to construct a biological sequence database using the entry.

In a fifth aspect, this application provides a system for labeling an association degree of biological sequences, and the system includes:
  a gene sequence outputting unit configured to output a relevant biological sequence including at least one attribute according to a database and attribute information; and
  a biological sequence association degree determining unit configured to label a relevancy dimension of each of the relevant biological sequences according to the associated number of each of the relevant biological sequences and the attribute information.

In a sixth aspect, this application provides an apparatus for retrieving a document, the apparatus includes:
  an obtaining module configured to receive retrieval information;
  an entry matching module configured to match at least one candidate entry for the retrieval information from a database constructed by the method for constructing the database according to any one of the embodiments of this application;
  a retrieval result generating module configured to obtain a retrieval result according to the candidate entry.

In a seventh aspect, this application provides a computer device, including a memory, a processor, and a computer program stored on the memory and executable by the processor, when the processor executes the computer program, steps of the method according to any of the embodiments of this application are implemented.

In an eighth aspect, this application provides a computer-readable storage medium on which a computer program is stored, when the computer program is executed by the processor, steps of the method according to any one of the embodiments of this application are implemented.

A method and an apparatus for constructing a database, a method and a system for labeling an association degree of biological sequences, a method and an apparatus for retrieving a document, a computer device and a storage medium are provided. The solution of this application extracts a biological sequence and attribute information from a target document and construct an entry in the database based on the extracted biological sequence and attribute information. When a user conducts retrieval based on the database, the server may match the entry for the user through the biological sequence, attribute information or a combination of the two in the entry. Therefore, when the database of this application is applied to a retrieval platform, the user is provided with various search supports such as biological sequence retrieval, biological sequence attribute retrieval, and comprehensive biological sequence and biological sequence attribute.

BRIEF DESCRIPTION OF DRAWINGS

FIG. 5 is retrieval result screenshots in an embodiment.

DETAILED DESCRIPTION OF THE EMBODIMENTS

In order to make the purpose, technical solutions and advantages of this application more clearly, this application will be described in further detail below with reference to the accompanying drawings and embodiments. It should be understood that the specific embodiments described herein are only used to explain this application, but not to limit this application.

Figure 1:
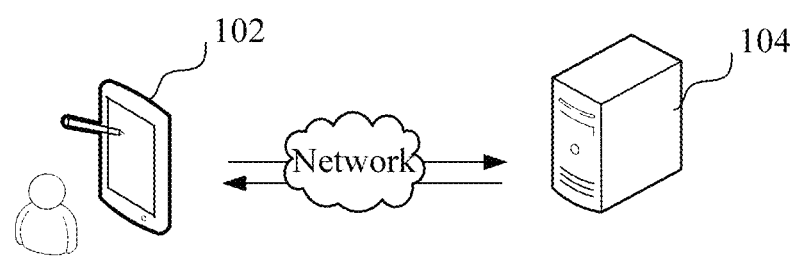
FIG. 1 is an application environment diagram of a method for constructing a database in an embodiment.

The method for constructing a biological sequence database provided in the present application may be applied to an application environment shown in FIG. 1. A terminal 102 communicates with a server 104 through the network. The server 104 may be implemented by an independent server or a server cluster including multiple servers. A processor of the server may execute a preset algorithm to identify specific terms (such as biological fields) and biological sequences in patent documents. The terminal 102 may be, but is not limited to, a personal computer, a notebook computer, a smart phone, or a tablet computer. The user can perform document retrieval through the terminal 102, and retrieval results are obtained through the document retrieval based on the biological sequence database. Alternatively, the server 104 may contain a database that is used for relevant retrieval of biological sequences. When a user needs to retrieve the relevant biological sequence, the user may interact with the server 104 through a corresponding interface on the terminal 102. After receiving a retrieval request input by the user through the terminal 102, the server 104 will match an entry in the database, and feedback the retrieval results to the user according to the entry.

Figure 2:
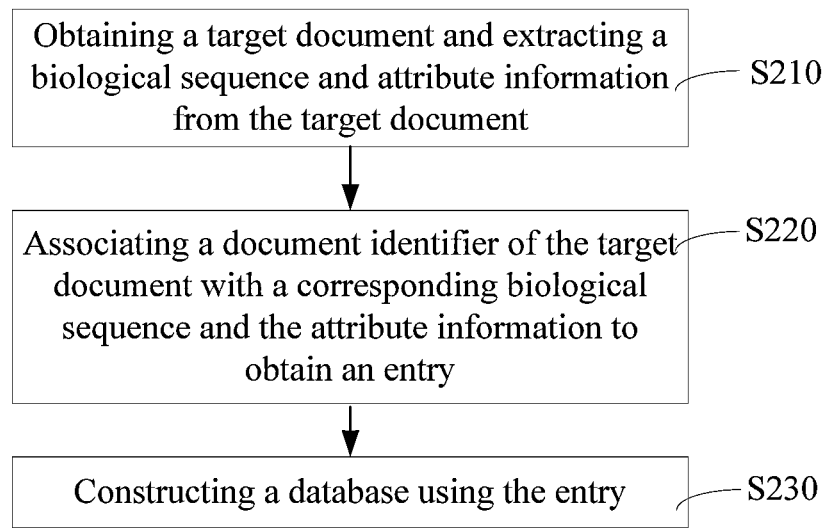
FIG. 2 is a schematic flowchart of a method for constructing a database in an embodiment.

In one of the embodiments, as shown in FIG. 2, a method for constructing a database is provided, and a database constructed by the method may be deployed on a server 104 in an application environment and applied to a searching engine to perform relevant searches. The method includes following steps.

Step S210: obtaining a target document and extracting a biological sequence and attribute information from the target document.

Specifically, the target document is generally a document in the biology field, such as a paper, a journal, a patent document, and the like. Specifically, a processor is used to extract the biological sequence and attribute information from the target document.

Alternatively, the processor first obtains a document from a data source to form a document set, and then obtains the target document from the document set according to a preset condition. Alternatively, the data source may be a professional document library, a platform, a website, or the like.

Alternatively, the preset condition may include: determining document types of documents in the document set; determining a filtering rule of a corresponding target document according to a difference between the document types, wherein filtering rules corresponding to different document types are different; wherein the filtering rule is used to filter documents of corresponding document types to obtain the target document.

Alternatively, the processor may extract the biological sequence and the attribute information in the target document through a trained deep learning model. Alternatively, the deep learning model may be a natural language processing model, such as Biobert, Scispacy, Variational Autoencoders, etc.

Before using the deep learning model, it is generally necessary to construct a model and train the model. The training process of the model is as follows.

First, a training sample is constructed, and the training sample is generally a document labeled with a biological sequence and attribute information of the biological sequence. Afterwards, the constructed training samples are used to train an initial deep learning model until a neural network of the initial deep learning model converges, that is, a trained deep learning model is obtained. The deep learning model may identify biological sequences and corresponding attribute information recorded in an input document.

Step S220: associating a document identifier of the target document with a corresponding biological sequence and the attribute information to obtain an entry.

The attribute information may include one or more of attributes relevant to the biological sequence like similarity percentage between biological sequences, a species, a preparation method, a variant, a function, an inclusion, a homology, an involved drug, an involved disease, etc. Specifically, the processor associates the document identifier of the target document with the corresponding biological sequence and the attribute information to obtain the entry.

Further, a search application server solr may be used to associate and map the document identifier, the biological sequence identifier of the corresponding biological sequence, and the attribute information to obtain the entry.

Step S230: constructing a database using the entry.

Specifically, the processor adds the obtained entry to the database to construct the database.

Alternatively, in order to cope with the fact that the user can target any library and conduct the search, when constructing the database, the entries obtained from documents of different document categories may be stored separately. For example, the entries of papers, journals, and patent documents may be stored in corresponding storage spaces of the database, respectively. Based on this, if the user wishes to retrieve the patent application status of the biological sequence a, after receiving the request, the server 104 will match an entry for the biological sequence a from the storage space corresponding to the entry of the patent document, and then generate the retrieval result according to the entry. When constructing the database, the processor may also use the document category of the document to label the corresponding entry.

Further, the processor may identify the document type of the document according to a feature of the document. This feature can be a difference between different layouts for different types of documents. For example, different layouts of drawings in journals and drawings in patent documents. Alternatively, when determining the document types of documents in the document set, the processor may first perform text recognition on the documents in the document set to obtain text information contained in the documents; then, determine the document types of documents in the document set according to a preset keyword contained in the text information. This method can quickly and accurately identify document types with specific expressions. For example, when identifying patent documents, "characterized by" can be set as a keyword for the document type identification.

The method for constructing the database in this embodiment constructs the entry in the database based on the extracted biological sequence and the attribute information. When the user searches based on the database, the server can match the entry for the user through a manner of the biological sequence, the attribute information in the entry, or a combination of the two. Therefore, when the database is applied to the retrieval platform, the user is provided with various search supports such as biological sequence retrieval, biological sequence attribute retrieval, and comprehensive biological sequence and biological sequence attributes.

In one of the embodiments, the above method for constructing the database may further include: analyzing technical terms and/or attribute information in the biology field by the processor to obtain association information; and performing association processing on the entry according to the association information to obtain a biological sequence database.

In this embodiment, the association information is obtained by analyzing the technical terms and/or the attribute information in the biology field, and the association information may be used to associate entries of different words expressing the same or similar meanings in the biology field, such as DNA, deoxygenation RNA, gene, and genetic material expressing the same or similar meanings in the biological field, and the processor may process the information in the entries as equivalent. Further, it is also possible to perform association processing on the entries containing part or all of the attribute information. For example, the biological sequence a and a biological sequence b can both be applied to the treatment of non-small cell lung cancer, and the processor may perform association processing on the entries of the biological sequence a and the biological sequence b. Alternatively, when the processor performs the association processing on the entries, an association level may be set according to different association information. For example, in the biology field, the association of entries of different words that express the same or similar meanings is a higher-level association, while the association of entries that contain part or all of the attribute information is a lower-level association. Further, when performing association processing on the entries containing part or all of the attribute information, the association level may also be set according to a degree of overlap of the attribute information of the two biological sequences.

The method of this embodiment performs association processing on the entries, which makes it possible to provide users with more diversified retrieval results (for example, association retrieval) when retrieval results are provided based on the biological sequence database. For example, if the entry that the biological sequence database exactly matches with the biological sequence a is an entry that contains the biological sequence a and a sequence number of the biological sequence a, the biological sequence database contains too few entries of the biological sequence a (for example, less than the preset number of 10), the entry associated with the biological sequence a may also be used as a candidate entry, and the candidate entry is used to generate the retrieval result. Alternatively, the entry associated with the biological sequence a may be selected as the candidate entry according to the association level. Therefore, the search based on the biological sequence database can provide users with more complete retrieval results.

In one of the embodiments, when the target document is a patent document, step S210 may include: the processor extracts the biological sequence and the attribute information in the claims and/or other parts of the patent document, wherein the other parts are parts of the patent document except the claims. Alternatively, since the biological sequence described in the patent document is represented by a sequence number (seq ID No) in many cases, a specific sequence is generally recorded in a corresponding sequence table, and each sequence number corresponds to a certain sequence number. Therefore, when performing retrieval for the biological sequence recorded in the patent document, it is also necessary to pay attention to the sequence number that identifies the biological sequence. Therefore, when extracting the biological sequence of the patent document, the biological sequence number (seq ID No) in the patent document and the biological sequence may be processed as equivalent.

Alternatively, when extracting the biological sequence and attribute information in the claims and/or other parts of the patent document, a corresponding claim tree can be obtained first according to a claim structure of each patent document; then an identical sequence in each of the claims in the corresponding patent document is identified through the claim tree and biological technical terms. Finally, the biological sequences and the attribute information in claims are identified based on these identical sequences.

The method of this embodiment extracts the biological sequence and the attribute information from the claims and/or other parts of the patent document and constructs the entries in the biological sequence database based on the extracted biological sequence and the attribute information. A searching based on the biological sequence database can meet different types of retrieval requirements such as patent novelty and freed to operate.

In one of the embodiments, in order to meet a user's specific retrieval requirement, when constructing the biological sequence database, a location identifier may also be used to label an extraction location of the attribute information in the entry or storing corresponding entry separately according to the extraction location of the attribute information. The specific retrieval requirement may be retrieval such as novelty retrieval, free-to-operate retrieval, and the like.

The solution in this embodiment distinguishes the entries according to the extraction locations of the biological sequences. When conducting the infringement analysis, the user can select to search the entry corresponding to the claim and obtain the retrieval result. In this way, the user is provided with more precise data for feedback.

Figure 3:
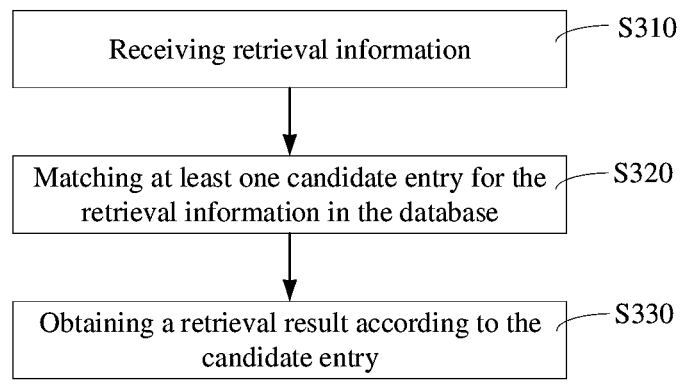
FIG. 3 is a schematic flowchart of a method for retrieving a document in an embodiment.

Based on the same inventive concept, in one of the embodiments of the present application, as shown in FIG. 3, a method for retrieving a document is also provided. The method is applied to the application scenario in FIG. 1 as an example for illustration. In this application scenario, a user may input retrieval information through a retrieval interface provided by a retrieval platform on a terminal 102 to obtain a retrieval result. After inputting the retrieval information through the retrieval interface, the terminal 102 generates a retrieval request according to the retrieval information input by the user and sends the request to a server 104. Based on the retrieval request, the server 104 matches entries for the retrieval information in its biological sequence database and generates the retrieval result according to the matched entries. The retrieval result may be sent to the retrieval interface of the terminal 102 for display. The method specifically includes following steps.

Step 310: receiving retrieval information.

The retrieval information is one or a combination of a biological sequence and attribute information of the biological sequence.

In the retrieval method proposed in the embodiment of this application, the user can select two modes to perform relevant retrieval. When the user wishes to conduct retrieval through biological sequences, a sequence query mode can be selected; when the user wishes to conduct retrieval through the attributes of biological sequences, an attribute query mode can be selected. In the attribute query mode, the user can input at least one kind of attribute information as retrieval information. Alternatively, the user can also choose a hybrid retrieval mode that is a combination of the sequence query mode and the attribute query mode. For example, after inputting the query sequence, the user may further input attribute information to define the biological sequence. Of course, when inputting the query sequence, the user can also input a preset fuzzy retrieval character instead of a specific base in the query sequence to expand the retrieval range.

Step 320: matching at least one candidate entry for the retrieval information in a database.

The database is constructed using the method of the above embodiments. The database contains at least one entry, and each entry contains a document identification (such as a patent application number, a patent application publication/patent publication number, a journal number, etc.), biological sequence information, and attribute information of a biological sequence in the target document. Alternatively, the biological sequence information may be a biological sequence or identity information of the biological sequence, such as seq ID No. Specifically, after obtaining the retrieval information, the server 104 matches at least one candidate entry for the retrieval information from the database in this application. Alternatively, solr may be used to process the retrieval information first to obtain an index, and then the index may be used to match the at least one candidate entry for the retrieval information in the biological sequence database.

Step 330: obtaining a retrieval result according to the candidate entry.

Specifically, after obtaining the candidate entry, the server 104 may obtain the retrieval result according to the information contained in the candidate entry. Alternatively, the information contained in the candidate entry may be processed correspondingly according to a retrieval result type selected by the user to obtain the retrieval result. Alternatively, retrieval result types may include: a basic view, a new field view of sequence similarity, a genome view, an inclusion view, a functional similarity view, and the like. These retrieval result types correspond to different display information respectively, and the display information is relevant information expected by the user. Alternatively, the server 104 displays a document identifier (for example, the patent application number) and attribute information in each candidate entry as the retrieval result.

The above-mentioned document retrieval method is applicable to retrieval scenarios relevant to biological sequences. The method may be applied to a variety of retrieval modes, including but not limited to retrieval using a sequence directly, retrieval using attribute information directly, retrieval using a combination of multiple attribute information, and retrieval using a sequence combined with an attribute. This enables the user to achieve diverse retrieval needs without switching multiple platforms.

In one of the embodiments, after receiving the original retrieval information, the server 104 may first obtain the relevant sequence according to the original retrieval information, and then use a relevant sequence as the retrieval information in step S310. The relevant sequence is a biological sequence obtained based on the retrieval information. Alternatively, the user may input retrieval information through the user interface of the terminal 102. The server 104 receives the retrieval information and obtains the relevant sequence according to the retrieval information.

In one of the embodiments, if the user selects the sequence query mode, the original retrieval information input by the user is the query sequence. The server 104 may first perform retrieval processing on the query sequence in the biological information database based on the blast program and the FASTA program to obtain the relevant sequence that match the query sequence. Then, the relevant sequence is used as the retrieval information in step S310. Alternatively, the biological information database may be the National Center for Biotechnology Information of the United States (NCBI), the DNA database of Japan (DDBJ), or the nucleotide database of the European Molecular Biology Laboratory (EMBL). Generally, after the user inputs the query sequence, the server 104 may determine the relevant sequence according to a similarity percentage between the biological sequence and the query sequence (biological sequence).

Figure 4:
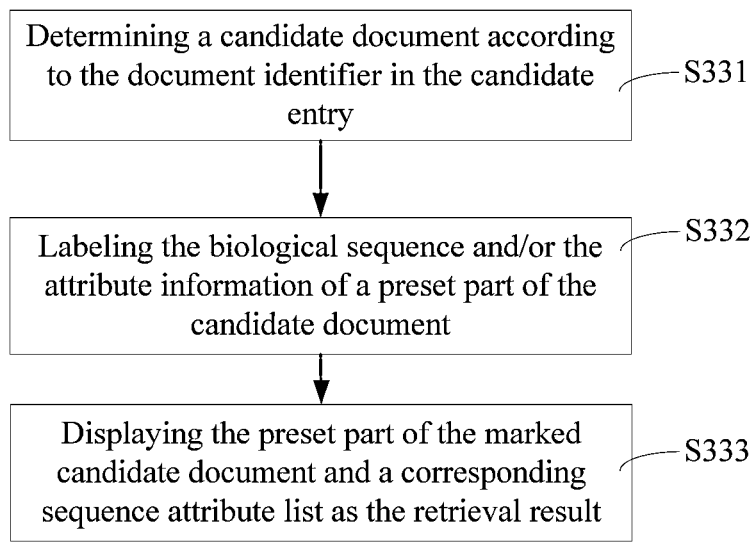
FIG. 4 is a schematic flowchart of detailed steps of step S330 in an embodiment.

In one of the embodiments, as shown in FIG. 4, step S330 includes the follows.

Step S331: determining a candidate document according to the document identifier in the candidate entry.

Step S332: labeling the biological sequence and/or the attribute information of a preset part of the candidate document. For example, when the candidate document is a patent document, the preset part may be set to be claims, an abstract of the specification, an independent claim, or the like. When the candidate document is a journal article, the preset part may be an abstract.

Step S333: displaying the preset part of the marked candidate document and a corresponding sequence attribute list as the retrieval result.

Figure 5:
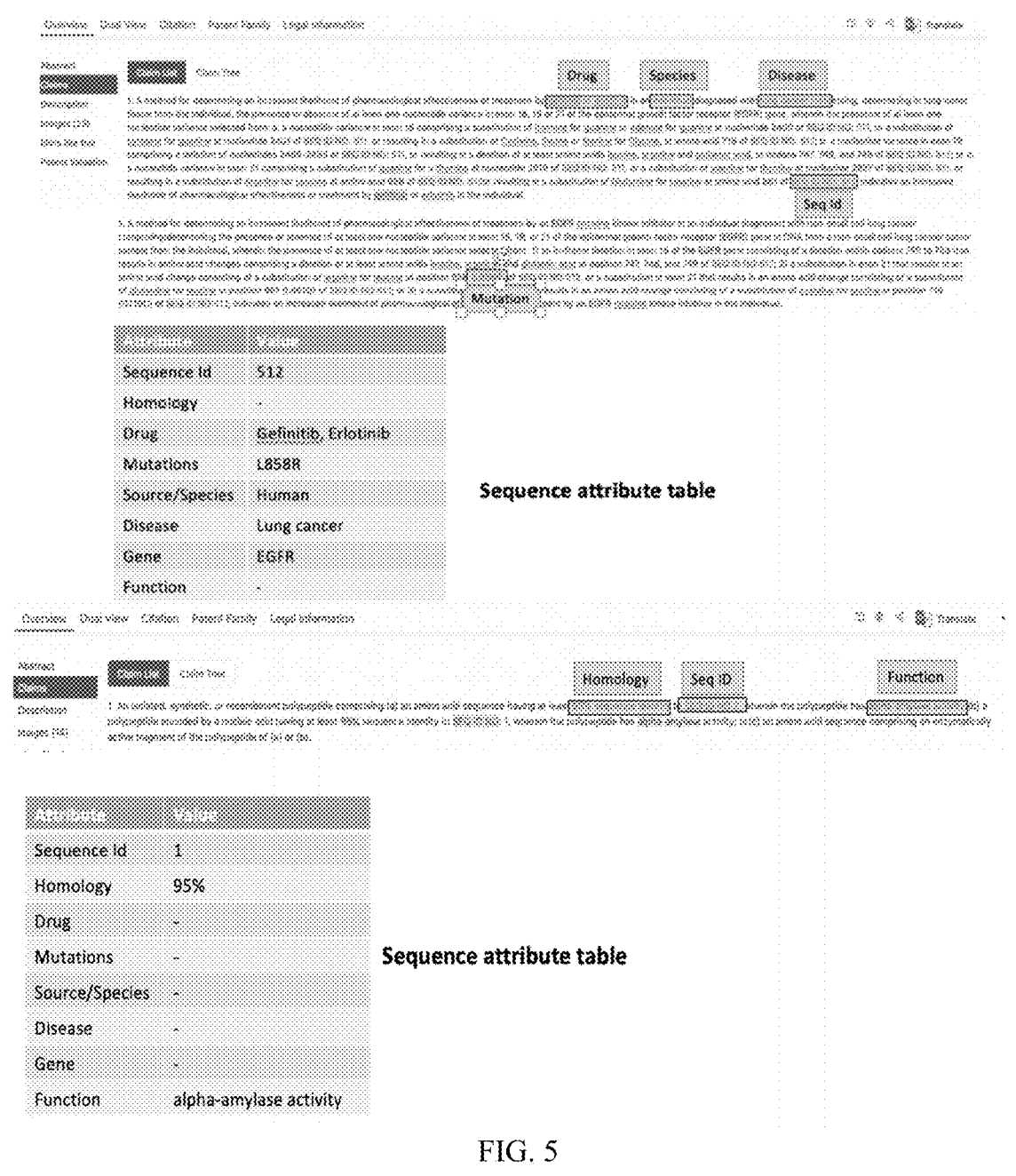

The sequence attribute list is obtained according to the biological sequence and the attribute information in the candidate entry. Alternatively, the sequence attribute list may include one or more of the properties relevant to the biological sequence such as a similarity percentage, a species, a preparation method, a variant, a function, an inclusion, a homology, an involved drug, an involved disease, and the like of the corresponding biological sequence. Details can be seen in FIG. 5.

The method of this embodiment may comprehensively and concisely present the biological sequence involved in the candidate document and the relevant attribute of the biological sequence to the user. For example, when the obtained candidate document is a patent document, the user can quickly and comprehensively obtain the attribute information of the biological sequence claimed in the patent according to the retrieval result of the method in this embodiment.

Figure 6:
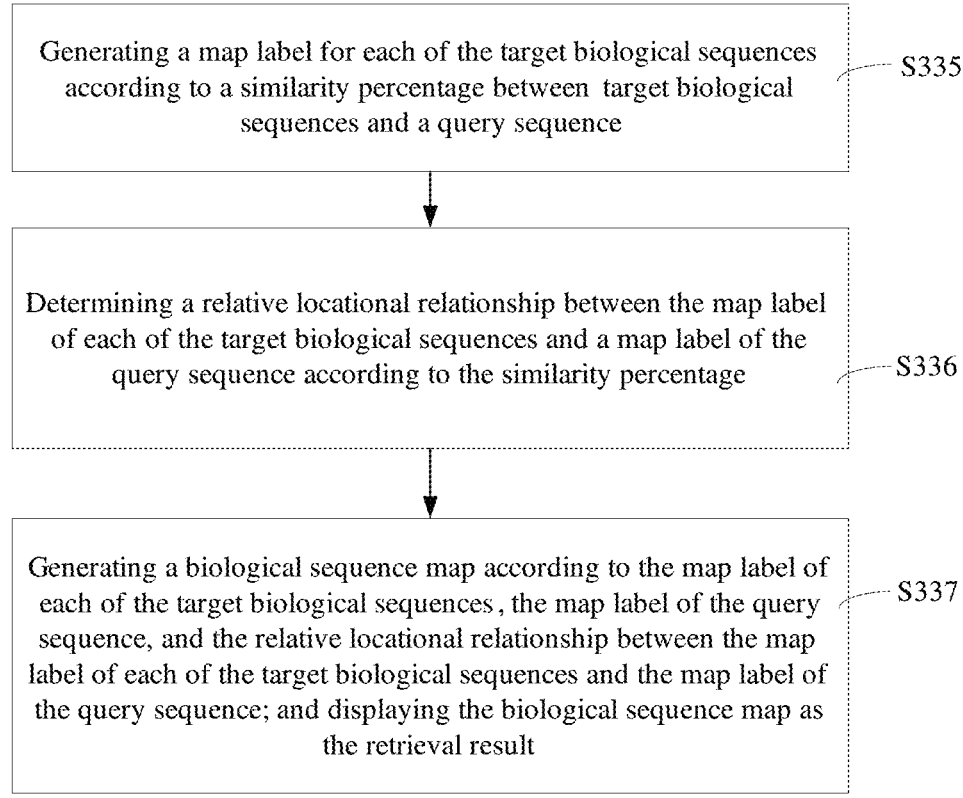
FIG. 6 is a schematic flowchart of detailed steps of step S330 in another embodiment.

In one of the embodiments, as shown in FIG. 6, if the user selects the sequence query mode, the retrieval information includes a query sequence, and step S330 includes:

Step S335: generating a map label for each of the target biological sequences according to a similarity percentage between target biological sequences and a query sequence.

The target biological sequence is the biological sequence corresponding to each candidate entry. A map labels is a constituent element of a biological sequence map. Alternatively, the map label can be a bar graph. Alternatively, a height of the bar graph may increase as the corresponding similarity percentage increases. Alternatively, different colors may also be used to distinguish the bar graphs corresponding to the similar percentages in different ranges.

Step S336: determining a relative locational relationship between the map label of each of the target biological sequences and a map label of the query sequence according to the similarity percentage. Alternatively, the distance between the map label of the corresponding target biological sequence and the map label of the query sequence may be set in descending order of the similarity percentage.

Step S337: generating a biological sequence map according to the map label of each of the target biological sequences, the map label of the query sequence, and the relative locational relationship between the map label of each of the target biological sequences and the map label of the query sequence; and displaying the biological sequence map as the retrieval result.

Figure 7:
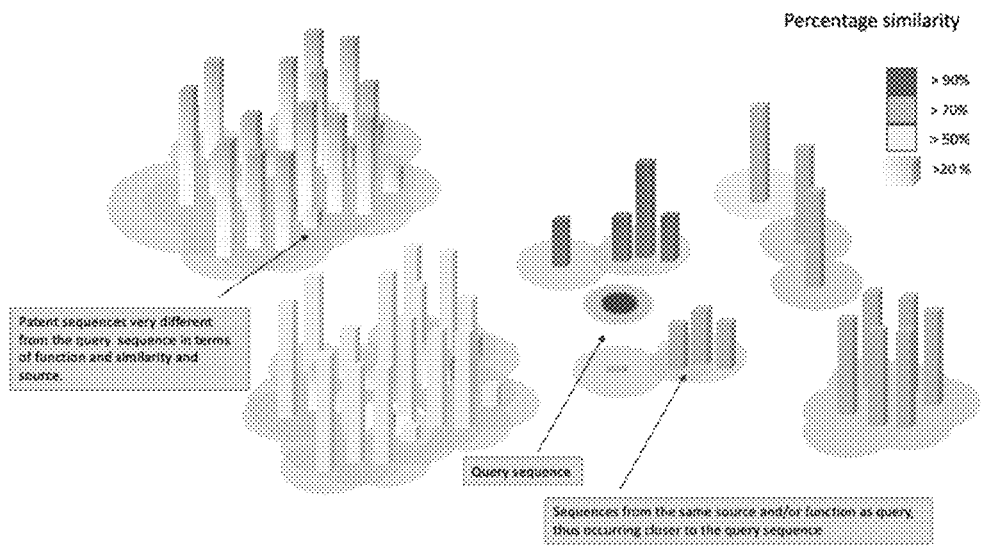
FIG. 7 is a biological sequence map in an embodiment.

Alternatively, when generating the biological sequence map, the location of the map label of the query sequence in the biological sequence map may be determined first, and then the location of the map label of each of the target biological sequences in the biological sequence graph may be determined according to the map label of the query sequence and the relative location between the map label of each of the target biological sequences and the map label of the query sequence. The specific form of the biological sequence map can be seen in FIG. 7. Alternatively, the patent document or journal corresponding to the target biological sequence may also be linked to the map label on the biological map in a form of a hyperlink, so that the user can obtain the original text of the corresponding document through simple interactional operations (for example, click a preset icon with a mouse).

The method of this embodiment may enable the user to quickly know the similarity percentage between the query sequence and the target biological sequence.

Figure 8:
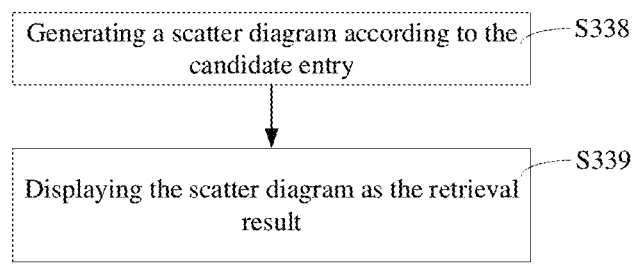
FIG. 8 is a schematic flowchart of detailed steps of step S330 in another embodiment.

In one of the embodiments, as shown in FIG. 8, if the user selects the sequence query mode, the retrieval information includes a query sequence, and the retrieval result type selected by the user is a new field view of sequence similarity. Step S330 includes the follows.

Step S338: generating a scatter diagram according to the candidate entry.

Figure 9:
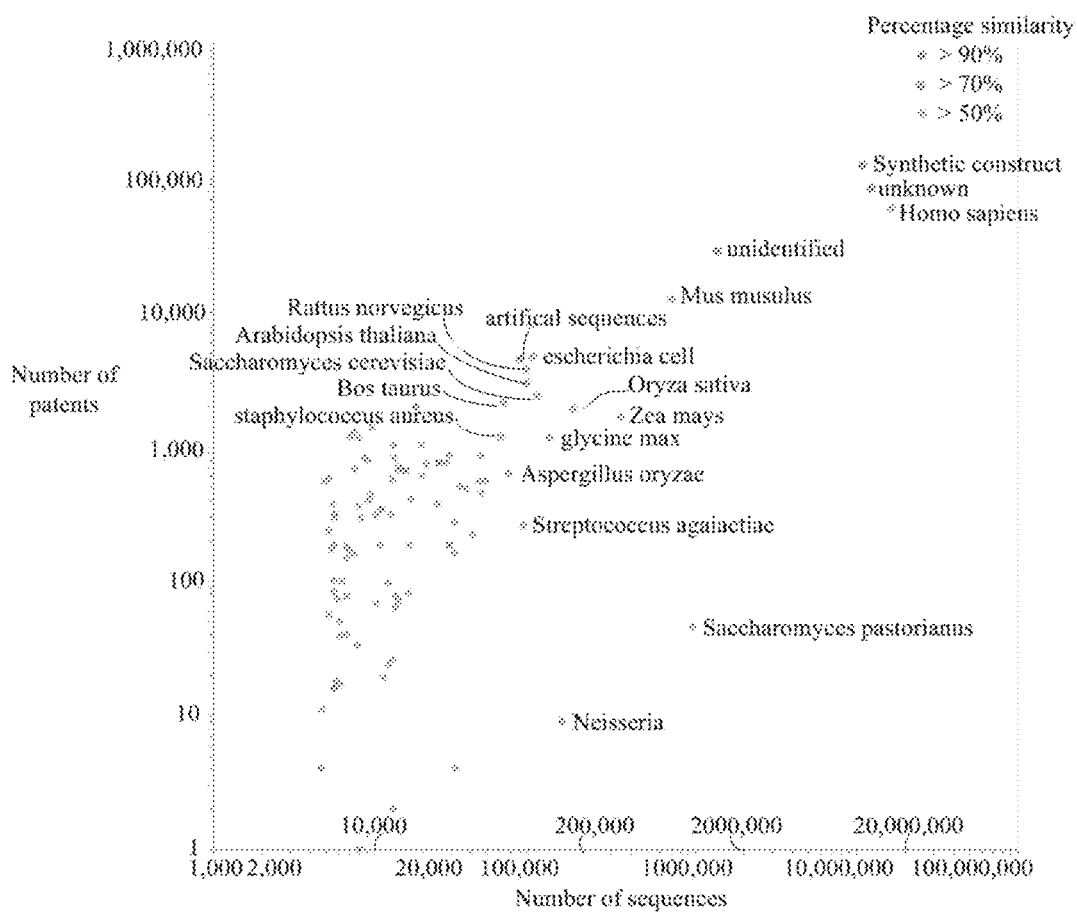
FIG. 9 is a new field view of similarity in an embodiment.

Please refer to the new field view of similarity in FIG. 9, dots in the scatter diagram are relevant species obtained according to the attribute information of the candidate entry. An X-axis of the scatter diagram is a number of the biological sequences involved in the relevant species, and a Y-axis of the scatter diagram is a number of patents involved in the relevant species. Alternatively, the dots in the scatter diagram may represent an average similarity percentage between the biological sequence contained in the species and the query sequence. Specifically, the server 104 first calculates the average of the similarity percentages between the biological sequences involved in each of the relevant species; and then sets a color and/or a shape of each dot in the scatter diagram according to the average of the similarity percentages.

Step S339: displaying the scatter diagram as the retrieval result.

The method of this embodiment can intuitively reflect the relationship between species, biological sequences and query sequences for the user, so as to facilitate selection of appropriate species when doing innovative research or market research.

Figure 10:
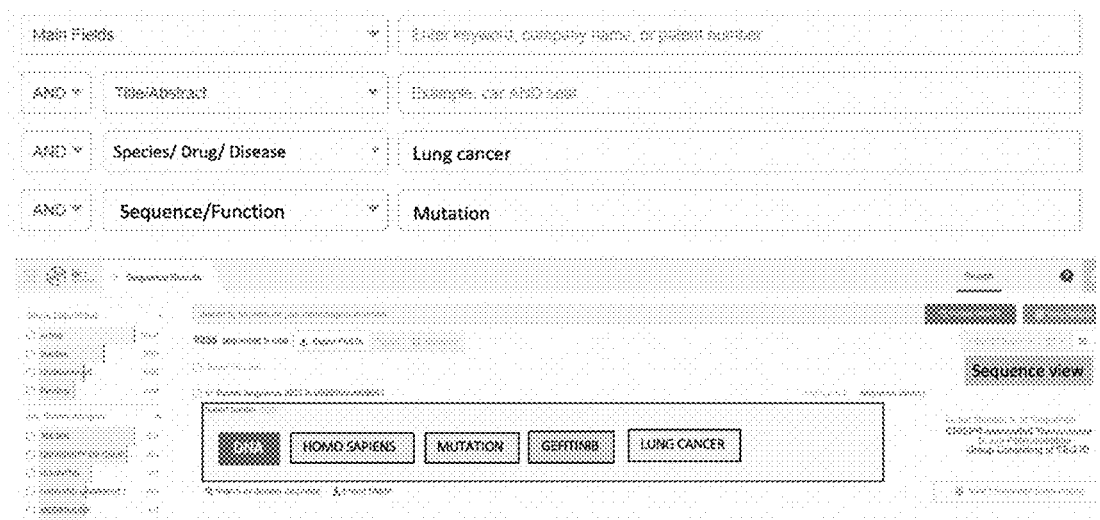
FIG. 10 is a basic view of an attribute query mode in an embodiment.

In one of the embodiments, if the user selects the attribute query mode, the retrieval information includes a query sequence, and the server 104 may display the patent document identification number and attribute information in the candidate entry as the retrieval result. For example, FIG. 10 is a basic view of an attribute query mode provided by an embodiment of this application.

In one of the embodiments, if the user selects the attribute query mode, the original retrieval information input by the user includes attribute information. The server 104 may first perform preamble processing on the attribute information to obtain a relevant sequence matching the attribute information. Then, the relevant sequence is used as the retrieval information in step S310.

Figure 11:
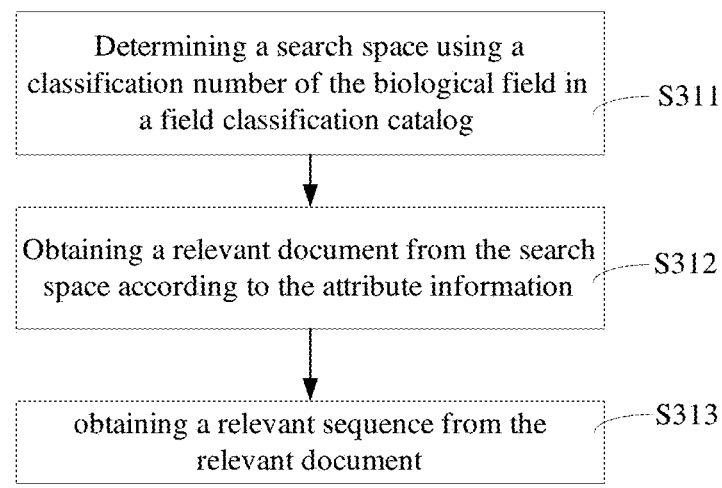
FIG. 11 is a schematic flowchart of detailed steps of step S310 in an embodiment.

Specifically, as shown in FIG. 11, at this time, S310 includes the follows.

Step S311: determining a search space using a classification number of the biological field in a field classification catalog. Alternatively, the classification number may be an IPC classification number or a CPC classification number or the like.

Step S312: obtaining a relevant document from the search space according to the attribute information.

Step S313: obtaining a relevant sequence from the relevant document. The relevant sequence may be used as retrieval information to perform steps S320-S330 in the method for retrieving the document in any of the above embodiments, and sub-steps of steps S320-S330.

In this embodiment, a space for obtaining the relevant sequence is limited by the classification number associated with the biological field, which narrows the search range, thereby improving the response efficiency of the server.

Figure 12:
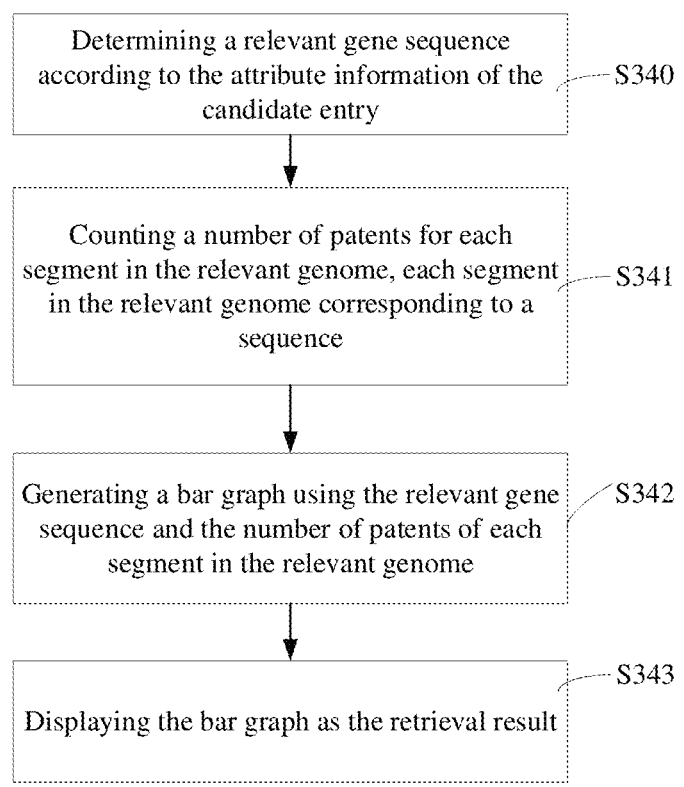
FIG. 12 is a schematic flowchart of detailed steps of step S330 in another embodiment.

In one of the embodiments, as shown in FIG. 12, if the user selects the attribute query mode, and the retrieval result type selected by the user is a genome view, step S330 includes the follows.

Step S340: determining a relevant gene sequence according to the attribute information of the candidate entry.

Step S341: counting a number of patents for each segment in the relevant genome, each segment in the relevant genome corresponding to a sequence.

Step S342: generating a bar graph using the relevant gene sequence and the number of patents of each segment in the relevant genome.

Figure 13:
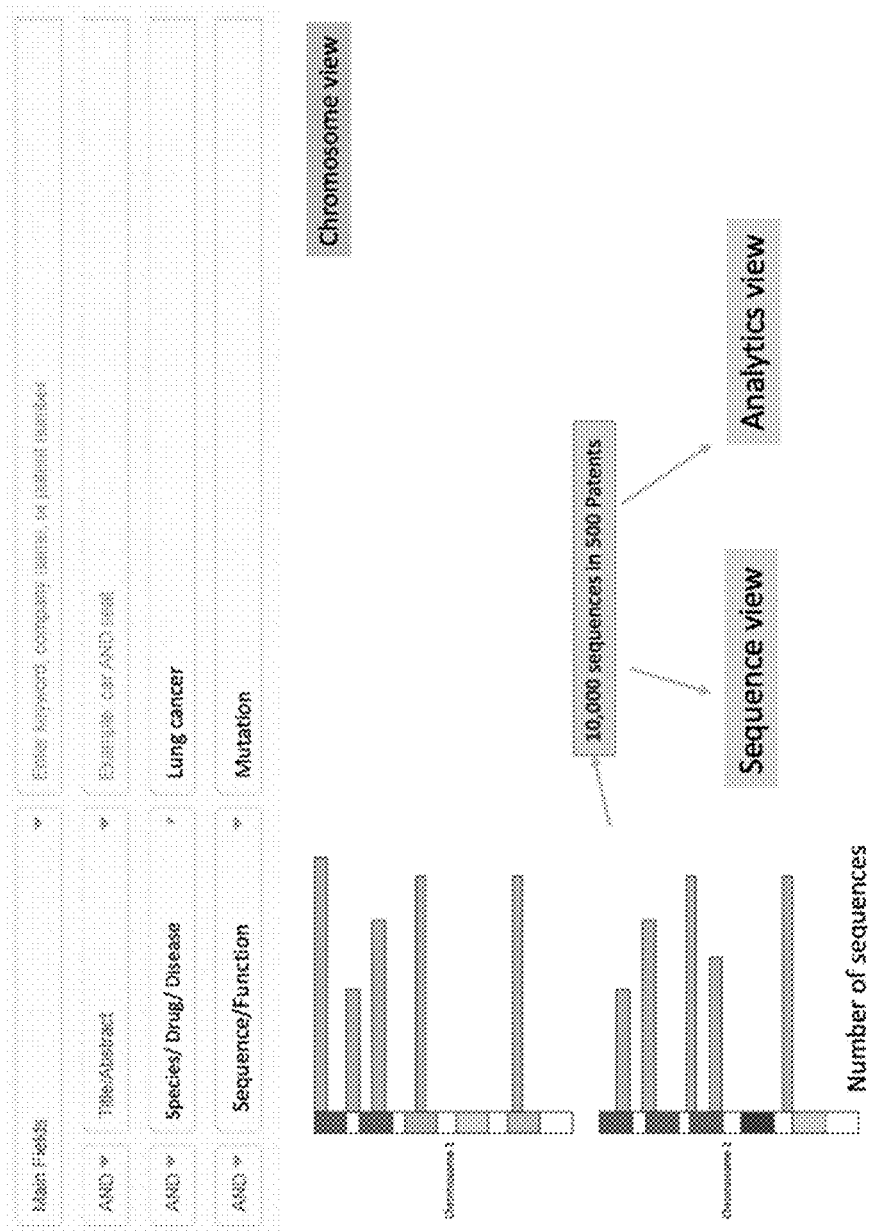
FIG. 13 is a genome view in an embodiment.

Step S343: displaying the bar graph as the retrieval result. Details can be seen in the genome view in FIG. 13.

The solution of this embodiment can intuitively display the patent application status of each gene segment for the user, which is convenient for the user to carry out research and development work.

Figure 14:
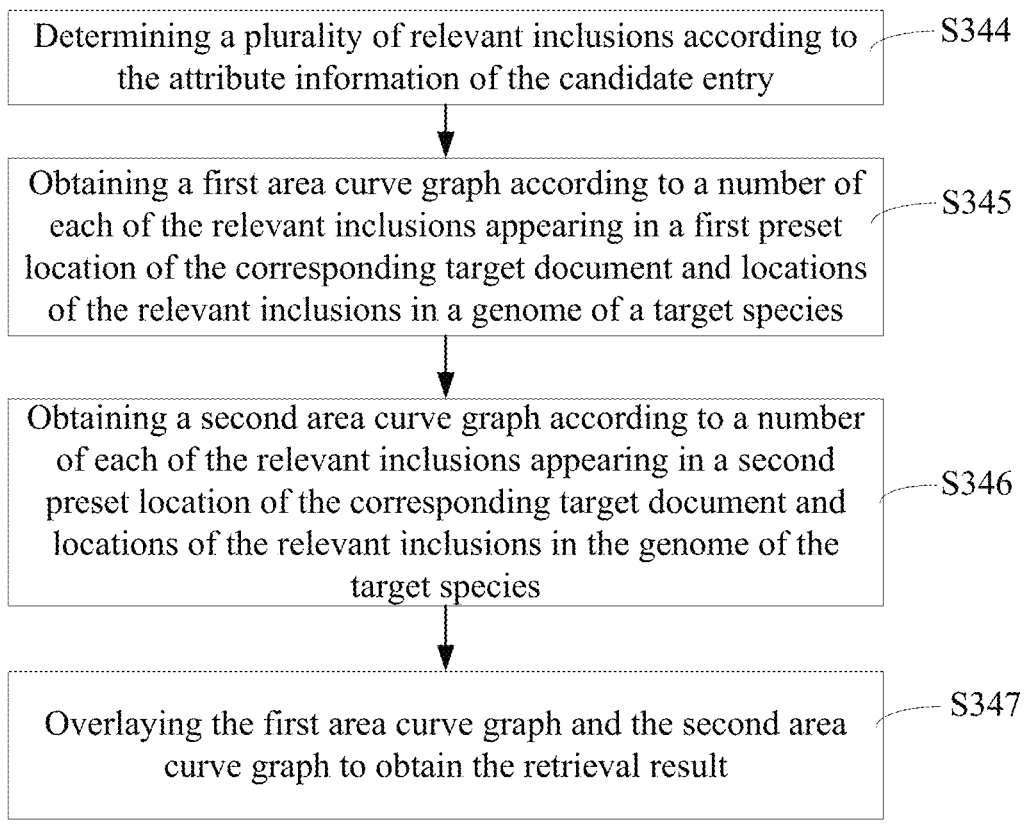
FIG. 14 is a schematic flowchart of detailed steps of step S330 in another embodiment.

In one of the embodiments, as shown in FIG. 14, if the user selects the attribute query mode, and the retrieval result type selected by the user is an inclusion view, step S330 includes the follows.

Step S344: determining a plurality of relevant inclusions according to the attribute information of the candidate entry.

Step S345: obtaining a first area curve graph according to a number of each of the relevant inclusions appearing in a first preset location of the corresponding target document and locations of the relevant inclusions in a genome of a target species. Alternatively, if the target document is a patent document, the first preset location may be a claim.

Step S346: obtaining a second area curve graph according to a number of each of the relevant inclusions appearing in a second preset location of the corresponding target document and locations of the relevant inclusions in the genome of the target species. Alternatively, if the target document is a patent document, the second preset location may be another location in the patent document other than the claims, such as a detailed description of the embodiments and the like.

Figure 15:
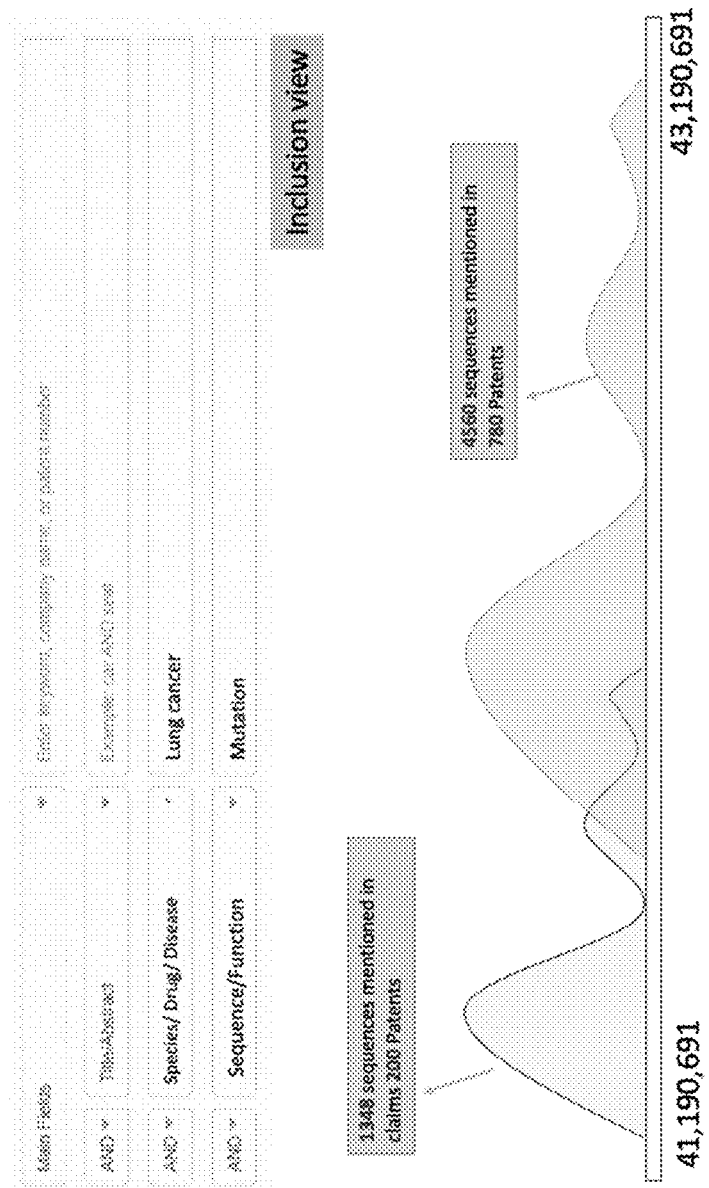
FIG. 15 is a view of inclusions in an embodiment.

Step S347: overlaying the first area curve graph and the second area curve graph to obtain the retrieval result. Details can be seen in the inclusions view of FIG. 15.

The method of this embodiment can intuitively display the extraction location of the biological sequence relevant to the user for the user, which is beneficial for the user to realize a thorough FTO search.

Figure 16:
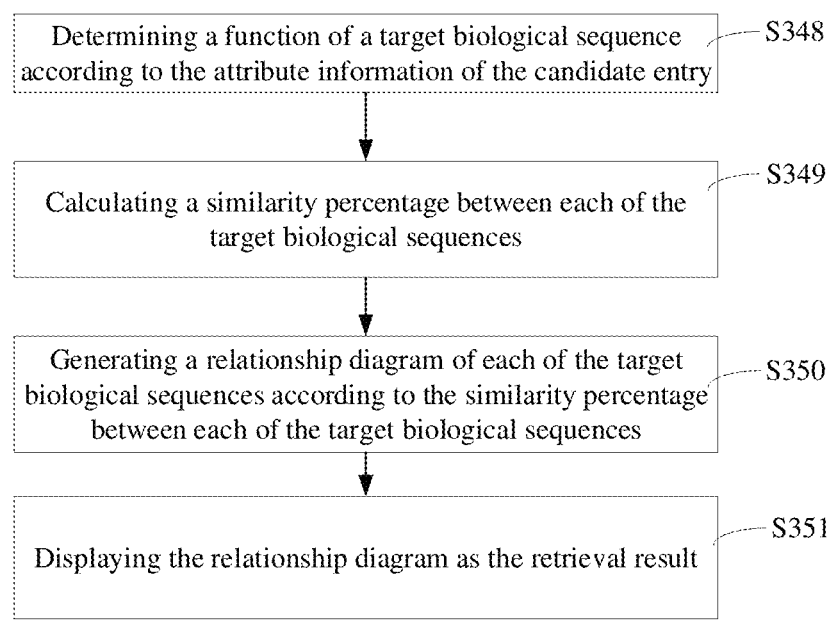
FIG. 16 is a schematic flowchart of detailed steps of step S330 in another embodiment.

In one of the embodiments, as shown in FIG. 16, if the user selects the attribute query mode, the retrieval information includes a query sequence, and the retrieval result type selected by the user is a functional similarity view. Step S330 includes the follows.

Step S348: determining a function of a target biological sequence according to the attribute information of the candidate entry. The target biological sequence is the biological sequence corresponding to each candidate entry.

Step S349: calculating a similarity percentage between each of the target biological sequences.

Step S350: generating a relationship diagram of each of the target biological sequences according to the similarity percentage between each of the target biological sequences.

Each node in the relationship diagram corresponds to a target biological sequence, and a color and/or a shape of each node in the relationship diagram is set according to a function of the corresponding target biological sequence.

Figure 17:
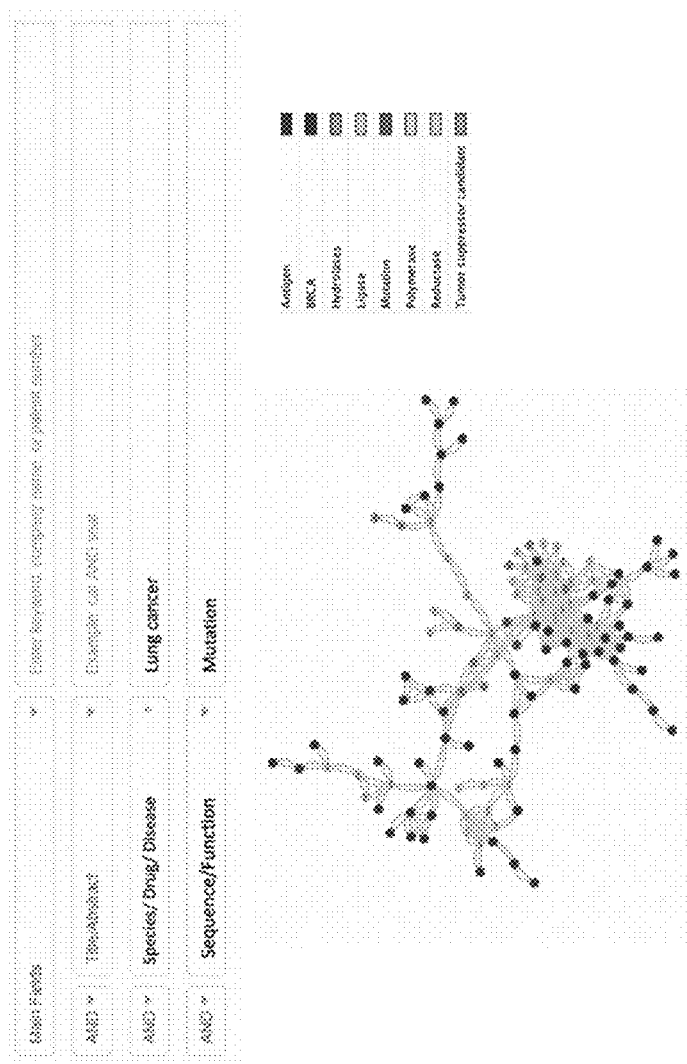
FIG. 17 is a functional similarity view in an embodiment.

Step S351: displaying the relationship diagram as the retrieval result. Details can be seen in a functional similarity view in FIG. 17.

The method in this embodiment may intuitively display the relationship between each target biological sequence and the function of similar sequence for the user, which is helpful for the user to discover the application of the target biological sequence in a new field and helps to promote innovation. For example, the attribute query in FIG. 17 uses the keywords "lung cancer" and "mutation". There are a large number of sequences (pink nodes) marked as BRCA in the relational graph of FIG. 17, based on this, it can be deduced that sequences targeting lung cancer are likely to be used to target breast cancer.

Figure 18:
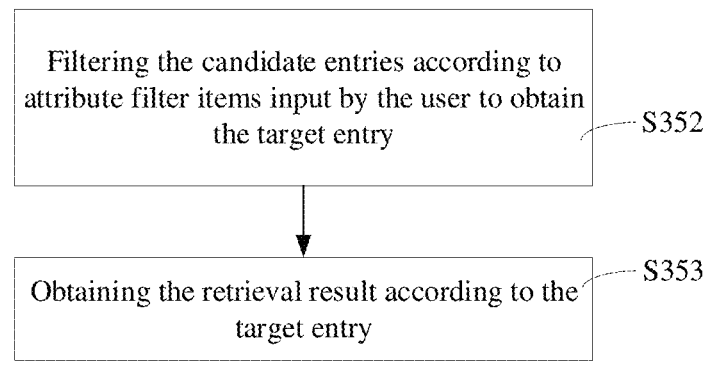
FIG. 18 is a schematic flowchart of detailed steps of step S330 in another embodiment.

In one of the embodiments, as shown in FIG. 18, step S330 includes the follows.

Step S352: filtering candidate entries according to attribute filter items input by a user to obtain a target entry, where the attribute filter items include one or more of similarity percentage, a species, a preparation method, a variant, a function, an inclusion, a homology, an involved drug, and an involved disease.

Step S353: obtaining the retrieval result according to the target entry.

The method of this embodiment may display the retrieval result according to the needs of the user, which is helpful for the user to filter effective information.

In one of the embodiments, this application also proposes a method for labeling an association degree of biological sequences. The method may be applied to the application environment shown in FIG. 1. The method includes: outputting a relevant biological sequence including at least one attribute according to the database and the attribute information; labeling a relevancy dimension of each of the relevant biological sequences according to an associated number of each of the relevant biological sequences and the attribute information.

The database is constructed according to any of the methods for constructing a database in the foregoing embodiments. Alternatively, the biological sequence may be a gene sequence, a protein sequence, and the like. Specifically, the server 104 first matches the received input information in the database constructed by the method according to the embodiments of this application to obtain a relevant biological sequence including at least one attribute, and then label the relevancy dimension of each of the relevant biological sequences according to the associated number of each of the relevant biological sequences and the attribute information.

For example, if the user inputs "non-small cell lung cancer", the server 104 matches "non-small cell lung cancer" in the database to find relevant biological sequences such as "EGFR gene sequence", "ALK gene sequence" (these gene sequences are relevant to "non-small cell lung cancer"), and then obtain the number of attributes other than "non-small cell lung cancer" from the entries containing "EGFR gene sequence" and "ALK gene sequence". If an entry contains "EGFR gene sequence", the gene sequence is relevant to "non-small cell lung cancer", the drug "icotinib hydrochloride", and the disease "psoriasis". The relevancy dimension of the "EGFR gene sequence" is labeled as 3.

With the method of this embodiment, the relevancy dimension of the relevant biological sequence can be known. Generally, the higher the relevancy dimension is, the higher the research value of the corresponding relevant biological sequence is. Therefore, this method may provide users with data analysis support before establishment of a research and development project and evaluate the research value of the biological sequence to some extent.

It should be understood that, although the steps in the flowcharts in the above embodiments are sequentially displayed according to the arrows, these steps are not necessarily executed in the order indicated by the arrows. Unless explicitly stated herein, the execution of these steps is not strictly limited to the order, and the steps may be executed in other orders. Moreover, at least a part of the steps in the above flowchart may include multiple sub-steps or multiple stages. These sub-steps or stages are not necessarily executed and completed at the same time but may be executed at different times. The execution order of these sub-steps or stages is also not necessarily sequential but may be performed alternately or alternately with other steps or sub-steps of other steps or at least a portion of a phase.

Figure 19:
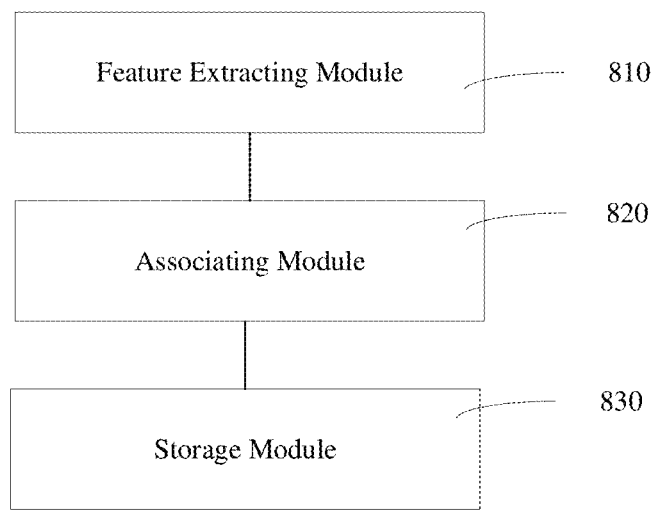
FIG. 19 is a structural block diagram of an apparatus for constructing a database in an embodiment.

In an embodiment, as shown in FIG. 19, an apparatus for constructing a biological sequence database is provided, including:
- a feature extracting module 810 configured to obtain a target document and extract a biological sequence and attribute information in the target document;
- an associating module 820 configured to associate a document identifier of the target document with a corresponding biological sequence and the attribute information to obtain an entry; and
- a storage module 830 configured to construct a database using the entry.

In one of the embodiments, the feature extracting module 810 is specifically configured to obtain a document from a data source to form a document set; and obtain the target document from the document set according to a preset condition.

In one of the embodiments, the feature extracting module 810 is specifically configured to perform text recognition on the documents in the document set to obtain text information contained in the documents; and determine the document types of documents in the document set according to a preset keyword contained in the text information. Alternatively, the document types of documents in the document set include at least one of patent documents and non-patent documents.

In one of the embodiments, the associating module 820 is further configured to analyze technical terms and/or attribute information in a biological field to obtain association information, wherein the attribute information includes one or more of similarity percentage between biological sequences, a species, a preparation method, a variant, a function, an inclusion, a homology, an involved drug, and an involved disease; perform association processing on the entry according to the association information to obtain a database.

In one of the embodiments, the feature extracting module 810 is specifically configured to extract the biological sequence and the attribute information in the claims and/or other parts of the patent document. The other parts are the parts of the patent document other than the claims.

In one of the embodiments, the feature extracting module 810 is specifically configured to obtain a corresponding claim tree according to a claim structure of each patent document; identify an identical sequence in each of the claims in the corresponding patent document through the claim tree and biological technical terms.

In one of the embodiments, the associating module 820 is specifically configured to index the document identifier of the target document, a biological sequence identifier of the corresponding biological sequence, and the attribute information using a search application server solr to obtain the entry. The attribute information includes one or more of similarity percentage between biological sequences, a species, a preparation method, a variant, a function, an inclusion, a homology, an involved drug, and an involved disease.

In one of the embodiments, the associating module 820 is further configured to label an extraction location of the attribute information in the entry using a location identifier; or store corresponding entry respectively according to the extraction location of the attribute information.

In one of the embodiments, the feature extracting module 810 is specifically configured to obtain a corresponding claim tree according to a claim structure of each patent document; identify an identical sequence in each of the claims in the corresponding patent document through the claim tree and biological technical terms.

In one of the embodiments, a system for labeling an association degree of biological sequences is provided, and the system includes:
- a gene sequence outputting unit configured to output a relevant gene sequence including at least one attribute according to the database and the attribute information, wherein the database is constructed according to the method for constructing the database of the above-mentioned embodiments; and
- a biological sequence association degree determining unit configured to label a relevancy dimension of each of the relevant biological sequences according to the associated number of each of the relevant gene sequences and the attribute information.

Figure 20:
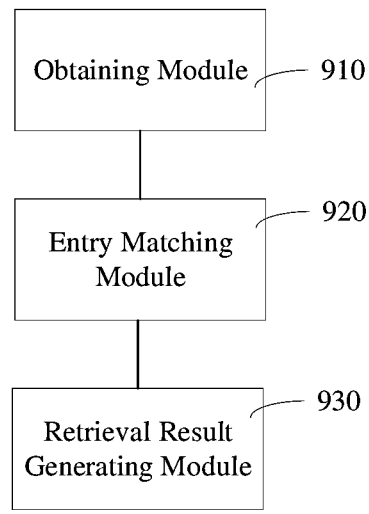
FIG. 20 is a structural block diagram of an apparatus for retrieving a document in an embodiment.
Figure 21:
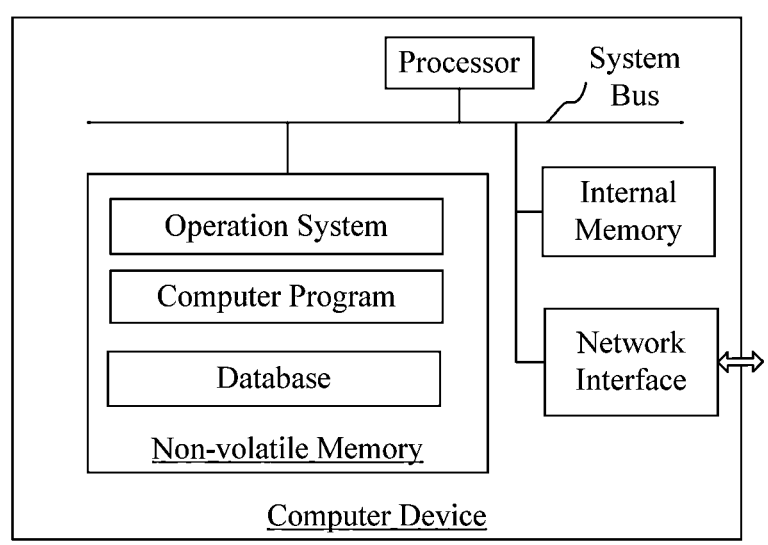
FIG. 21 is an internal structural diagram of a computer device in an embodiment.

In an embodiment, as shown in FIG. 20, an apparatus for retrieving a document is provided, including:
- an obtaining module 910 configured to receive retrieval information, wherein the retrieval information is one or a combination of a biological sequence and attribute information of the biological sequence;
- an entry matching module 920 configured to match at least one candidate entry for the retrieval information in a database constructed according to the method for constructing the database of any of the above-mentioned embodiments; and
- a retrieval result generating module 930 configured to obtain a retrieval result according to the candidate entry.

In one of the embodiments, the retrieval result generating module 930 is specifically configured to display a document identifier and attribute information in each candidate entry as the retrieval result.

In one of the embodiments, the retrieval result generating module 930 is specifically configured to determine a candidate document according to the document identifier in the candidate entry; label the biological sequence and/or the attribute information of a preset part of the candidate document; and display the preset part of the marked candidate document and a corresponding sequence attribute list as the retrieval result, wherein the sequence attribute list is obtained according to the biological sequence and the attribute information in the candidate entry.

In one of the embodiments, the retrieval result generating module 930 is specifically configured to obtain the retrieval result according to the candidate entry, including: generate a map label for each of the target biological sequences according to a similarity percentage between target biological sequences and a query sequence, wherein the target biological sequence is the biological sequence corresponding to each candidate entry; determine a relative locational relationship between the map label of each of the target biological sequences and a map label of the query sequence according to the similarity percentage; generate a biological sequence map according to the map label of each of the target biological sequences, the map label of the query sequence, and the relative locational relationship between the map label of each of the target biological sequences and the map label of the query sequence; and display the biological sequence map as the retrieval result.

In one of the embodiments, the retrieval result generating module 930 is specifically configured to: if the retrieval result type selected by the user is a new field view of sequence similarity, obtain the retrieval result according to the candidate entry, including: generate a scatter diagram according to the candidate entry, wherein a dot is a relevant species obtained according to the attribute information of the candidate entry, an X-axis of the scatter diagram is a number of biological sequences involved in the relevant species, and a Y-axis of the scatter diagram is a number of patents involved in the relevant species; and display the scatter diagram as the retrieval result.

In one of the embodiments, the retrieval result generating module 930 is specifically configured to calculate an average of similarity percentages between the biological sequences involved in each of the relevant species; and set a color and/or a shape of each dot in the scatter diagram according to the average of the similarity percentages.

In one of the embodiments, if the retrieval result type selected by the user is a genome view, the retrieval result generating module 930 is specifically configured to determine a relevant gene sequence according to the attribute information of the candidate entry; count a number of patents for each segment in the relevant genome, each segment in the relevant genome corresponding to a sequence; generate a bar graph using the relevant gene sequence and the number of patents of each segment in the relevant genome; and display the bar graph as the retrieval result.

In one of the embodiments, if the retrieval result type selected by a user is an inclusion view, the retrieval result generating module 930 is specifically configured to determine a plurality of relevant inclusions according to the attribute information of the candidate entry; obtain a first area curve graph according to a number of each of the relevant inclusions appearing in a first preset location of the corresponding target document and locations of the relevant inclusions in a genome of a target species; obtain a second area curve graph according to a number of each of the relevant inclusions appearing in a second preset location of the corresponding target document and locations of the relevant inclusions in the genome of the target species; overlay the first area curve graph and the second area curve graph to obtain the retrieval result.

In one of the embodiments, if a retrieval result type selected by a user is a functional similarity view, the retrieval result generating module 930 is specifically configured to determine a function of a target biological sequence according to the attribute information of the candidate entry; calculate a similarity percentage between each of the target biological sequences; generate a relationship diagram of each of the target biological sequences according to the similarity percentage between each of the target biological sequences, wherein each node in the relationship diagram corresponds to a target biological sequence, and a color and/or a shape of each node in the relationship diagram is set according to a function of the corresponding target biological sequence; display the relationship diagram as the retrieval result. In one of the embodiments, the retrieval result generating module 930 is specifically configured to filter candidate entries according to attribute filter items input by a user to obtain a target entry, wherein the attribute filter items include one or more of similarity percentage, a species, a preparation method, a variant, a function, an inclusion, a homology, an involved drug, and an involved disease; and obtain the retrieval result according to the target entry.

For the specific limitations of an apparatus for constructing a database, a system for labeling an association degree of biological sequences, and an apparatus for retrieving a document, please refer to the limitations of a method for constructing a database, a method for labeling an association degree of biological sequences, and a method for retrieving a document above, which will not be repeated here. All or part of the modules in the apparatus for constructing the database, the system for an association degree of biological sequences, and the apparatus for retrieving the document can be implemented in whole or in part by software, hardware, and combinations thereof. The above-mentioned modules may be embedded in or independent of the processor in the computer device in the form of hardware or stored in the memory in the computer device in the form of software, so that the processor can call and execute the operations corresponding to the above modules.

In an embodiment, a computer device is provided, the computer device may be a server, and its internal structure diagram may be as shown in FIG. 22. The computer device includes a processor, a memory, a network interface, and a database connected by a system bus. Among them, the processor of the computer device is configured to provide computing and controlling capabilities. The memory of the computer device includes a non-volatile storage medium, and an internal memory. The nonvolatile storage medium stores an operating system, a computer program, and a database. The internal memory provides an environment for the execution of the operating system and computer programs in the non-volatile storage medium. The database of the computer device is configured to store the entries. The network interface of the computer device is configured to communicate with an external terminal through a network connection. The computer program, when executed by a processor, a method for retrieving patent documents containing biological sequences is realized.

Those skilled in the art can understand that the structure shown in FIG. 22 is only a block diagram of a partial structure relevant to the solution of this application and does not constitute a limitation on the computer device to which the solution of this application is applied. A specific computer device includes more or fewer components than shown in the figures, or combine certain components, or have a different arrangement of components.

In an embodiment, a computer device is provided, which includes a memory, a processor, and a computer program stored in the memory and executable on the processor. When the processor executes the computer program, the following steps are implemented: obtaining a target document; extracting a biological sequence and attribute information in the target document; associating a document identifier of the target document with a corresponding biological sequence and the attribute information to obtain an entry; and constructing a database using the entry.

In an embodiment, the processor specifically implements the following steps when executing the computer program: obtaining a document from a data source to form a document set; and obtaining the target document from the document set according to a preset condition.

In an embodiment, the processor further implements the following steps when executing the computer program: performing text recognition on documents in the document set to obtain text information contained in the documents; determining the document types of documents in the document set according to a preset keyword contained in the text information.

In an embodiment, the processor further implements the following steps when executing the computer program: analyzing technical terms and/or attribute information in a biological field to obtain association information, wherein the attribute information includes one or more of similarity percentage between biological sequences, a species, a preparation method, a variant, a function, an inclusion, a homology, an involved drug, and an involved disease; performing association processing on the entry according to the association information to obtain a biological sequence database.

In an embodiment, the processor specifically implements the following steps when executing the computer program: extracting the biological sequence and the attribute information in the claims and/or other parts of the patent document. The other parts are parts of the patent document other than the claims.

In an embodiment, the processor specifically implements the following steps when executing the computer program: obtaining a corresponding claim tree according to a claim structure of each patent document; identifying an identical sequence in each of the claims in the corresponding patent document through the claim tree and biological technical terms.

In an embodiment, the processor specifically implements the following steps when executing the computer program: indexing the document identifier of the target document, a biological sequence identifier of the corresponding biological sequence, and the attribute information using a search application server solr to obtain the entry.

In an embodiment, the processor further implements the following steps when executing the computer program: labeling an extraction location of the attribute information in the entry using a location identifier; or storing corresponding entry respectively according to the extraction location of the attribute information.

In an embodiment, a computer device is provided, including a memory, a processor, and a computer program stored on the memory and executable on the processor, and the processor implements the following steps when executing the computer program: outputting a relevant gene sequence including at least one attribute according to the database and the attribute information; labeling a relevancy dimension of each of the relevant gene sequences according to an associated number of each of the relevant gene sequences and the attribute information.

In an embodiment, a computer device is provided, including a memory, a processor, and a computer program stored on the memory and executable on the processor, and the processor implements the following steps when executing the computer program: receiving retrieval information; matching at least one candidate entry for the retrieval information in the database; and obtaining a retrieval result according to the candidate entry.

In an embodiment, the processor specifically implements the following steps when executing the computer program: displaying a document identifier and the attribute information in each candidate entry as the retrieval result.

In an embodiment, the processor specifically implements the following steps when executing the computer program: determining a candidate document according to the document identifier in the candidate entry; labeling the biological sequence and/or the attribute information of a preset part of the candidate document; and displaying the preset part of the marked candidate document and a corresponding sequence attribute list as the retrieval result, wherein the sequence attribute list is obtained according to the biological sequence and the attribute information in the candidate entry.

In an embodiment, the processor specifically implements the following steps when executing the computer program: generating a map label for each of the target biological sequences according to a similarity percentage between target biological sequences and a query sequence, the target biological sequence being the biological sequence corresponding to each candidate entry; determining a relative locational relationship between the map label of each of the target biological sequences and a map label of the query sequence according to the similarity percentage; generating a biological sequence map according to the map label of each of the target biological sequences, the map label of the query sequence, and the relative locational relationship between the map label of each of the target biological sequences and the map label of the query sequence; and displaying the biological sequence map as the retrieval result.

In an embodiment, if the retrieval result type selected by the user is a new field view of sequence similarity, the processor specifically implements the following steps when executing the computer program: generating a scatter diagram according to the candidate entry, wherein a dot of the scatter diagram is a relevant species obtained according to the attribute information of the candidate entry, an X-axis of the scatter diagram is a number of biological sequences involved in the relevant species, and a Y-axis of the scatter diagram is a number of patents involved in the relevant species; and displaying the scatter diagram as the retrieval result.

In an embodiment, the processor further implements the following steps when executing the computer program: calculating an average of similarity percentages between the biological sequences involved in each of the relevant species; and setting a color and/or a shape of each dot in the scatter diagram according to the average of the similarity percentages.

In an embodiment, if the retrieval result type selected by the user is a genome view, the processor specifically implements the following steps when executing the computer program: determining a relevant gene sequence according to the attribute information of the candidate entry; counting a number of patents for each segment in the relevant genome, each segment in the relevant genome corresponding to a sequence; generating a bar graph using the relevant gene sequence and the number of patents of each segment in the relevant genome; and displaying the bar graph as the retrieval result.

In an embodiment, if the retrieval result type selected by the user is an inclusion view, the processor specifically implements the following steps when executing the computer program: determining a plurality of relevant inclusions according to the attribute information of the candidate entry; obtaining a first area curve graph according to a number of each of the relevant inclusions appearing in a first preset location of the corresponding target document and locations of the relevant inclusions in a genome of a target species; obtaining a second area curve graph according to a number of each of the relevant inclusions appearing in a second preset location of the corresponding target document and locations of the relevant inclusions in the genome of the target species; and overlaying the first area curve graph and the second area curve graph to obtain the retrieval result.

In an embodiment, if the retrieval result type selected by the user is a functional similarity view, the processor specifically implements the following steps when executing the computer program: determining a function of a target biological sequence according to the attribute information of the candidate entry, wherein the target biological sequence is the biological sequence corresponding to each of the candidate entries; calculating a similarity percentage between each of the target biological sequences; generating a relationship diagram of each of the target biological sequences according to the similarity percentage between each of the target biological sequences, wherein each node in the relationship diagram corresponds to a target biological sequence, and a color and/or a shape of each node in the relationship diagram is set according to a function of the corresponding target biological sequence; and displaying the relationship diagram as the retrieval result.

In an embodiment, the processor specifically implements the following steps when executing the computer program: filtering candidate entries according to attribute filter items input by a user to obtain a target entry, wherein the attribute filter items include one or more of similarity percentage, a species, a preparation method, a variant, a function, an inclusion, a homology, an involved drug, and an involved disease; and obtaining the retrieval result according to the target entry.

In an embodiment, a computer-readable storage medium is provided, on which a computer program is stored. When the computer program is executed by a processor, the following steps are implemented: obtaining a target document; extracting a biological sequence and attribute information in the target document; associating a document identifier of the target document with a corresponding biological sequence and the attribute information to obtain an entry; and constructing a database using the entry.

In an embodiment, when the computer program is executed by the processor, the following steps are specifically implemented: obtaining a document from a data source to form a document set; and obtaining the target document from the document set according to a preset condition.

In an embodiment, when the computer program is executed by the processor, the following steps are further implemented: performing text recognition on the documents in the document set to obtain text information contained in the documents; determining the document types of documents in the document set according to a preset keyword contained in the text information.

In an embodiment, when the computer program is executed by the processor, the following steps are specifically implemented: analyzing technical terms and/or attribute information in a biological field to obtain association information, wherein the attribute information includes one or more of similarity percentage between biological sequences, a species, a preparation method, a variant, a function, an inclusion, a homology, an involved drug, and an involved disease; performing association processing on the entry according to the association information to obtain a biological sequence database.

In an embodiment, when the computer program is executed by the processor, the following steps are specifically implemented: indexing the document identifier of the target document, a biological sequence identifier of the corresponding biological sequence, and the attribute information using a search application server solr to obtain the entry.

In an embodiment, when the computer program is executed by the processor, the following steps are specifically implemented: extracting the biological sequence and the attribute information in the claims and/or other parts of the patent document, wherein the other parts are parts of the patent document other than the claims.

In an embodiment, when the computer program is executed by the processor, the following steps are specifically implemented: obtaining a corresponding claim tree according to a claim structure of each patent document; identifying an identical sequence in each of the claims in the corresponding patent document through the claim tree and biological technical terms.

In an embodiment, when the computer program is executed by the processor, the following steps are specifically implemented: indexing the document identifier of the target document, a biological sequence identifier of the corresponding biological sequence, and the attribute information using a search application server solr to obtain the entry.

In an embodiment, when the computer program is executed by the processor, the following steps are specifically implemented: labeling an extraction location of the attribute information in the entry using a location identifier; or storing corresponding entry respectively according to the extraction location of the attribute information.

In an embodiment, a computer-readable storage medium is provided, on which a computer program is stored, and when the computer program is executed by a processor, the following steps are implemented: outputting a relevant gene sequence including at least one attribute according to a database and attribute information; labeling a relevancy dimension of each of the relevant biological sequences according to an associated number of each of the relevant gene sequences and the attribute information.

In an embodiment, a computer-readable storage medium is provided, on which a computer program is stored, and when the computer program is executed by a processor, the following steps are implemented: receiving retrieval information; matching at least one candidate entry for the retrieval information in the database; and obtaining a retrieval result according to the candidate entry.

In an embodiment, when the computer program is executed by the processor, the following steps are specifically implemented: displaying a document identifier and the attribute information in each candidate entry as the retrieval result.

In an embodiment, when the computer program is executed by the processor, the following steps are specifically implemented: determining a candidate document according to the document identifier in the candidate entry; labeling the biological sequence and/or the attribute information of a preset part of the candidate document; and displaying the preset part of the marked candidate document and a corresponding sequence attribute list as the retrieval result, wherein the sequence attribute list is obtained according to the biological sequence and the attribute information in the candidate entry.

In an embodiment, when the computer program is executed by the processor, the following steps are further implemented: generating a map label for each of the target biological sequences according to a similarity percentage between target biological sequences and a query sequence, wherein the target biological sequence is the biological sequence corresponding to each candidate entry; determining a relative locational relationship between the map label of each of the target biological sequences and a map label of the query sequence according to the similarity percentage; generating a biological sequence map according to the map label of each of the target biological sequences, the map label of the query sequence, and the relative locational relationship between the map label of each of the target biological sequences and the map label of the query sequence; and displaying the biological sequence map as the retrieval result.

In an embodiment, if the retrieval result type selected by the user is a new field view of sequence similarity, when the computer program is executed by the processor, the following steps are further implemented: generating a scatter diagram according to the candidate entry, wherein a dot of the scatter diagram is a relevant species obtained according to the attribute information of the candidate entry, an X-axis of the scatter diagram is a number of biological sequences involved in the relevant species, and a Y-axis of the scatter diagram is a number of patents involved in the relevant species; and displaying the scatter diagram as the retrieval result.

In an embodiment, when the computer program is executed by the processor, the following steps are further implemented: calculating an average of similarity percentages between the biological sequences involved in each of the relevant species; and setting a color and/or a shape of each dot in the scatter diagram according to the average of the similarity percentages.

In an embodiment, if the retrieval result type selected by the user is a genome view, when the computer program is executed by the processor, the following steps are further implemented: determining a relevant gene sequence according to the attribute information of the candidate entry; counting a number of patents for each segment in the relevant genome, each segment in the relevant genome corresponding to a sequence; generating a bar graph using the relevant gene sequence and the number of patents of each segment in the relevant genome; and displaying the bar graph as the retrieval result.

In an embodiment, if the retrieval result type selected by the user is an inclusion view, when the computer program is executed by the processor, the following steps are further implemented: determining a plurality of relevant inclusions according to the attribute information of the candidate entry; obtaining a first area curve graph according to a number of each of the relevant inclusions appearing in a first preset location of the corresponding target document and locations of the relevant inclusions in a genome of a target species; obtaining a second area curve graph according to a number of each of the relevant inclusions appearing in a second preset location of the corresponding target document and locations of the relevant inclusions in the genome of the target species; and overlaying the first area curve graph and the second area curve graph to obtain the retrieval result.

In an embodiment, if the retrieval result type selected by the user is a functional similarity view, when the computer program is executed by the processor, the following steps are further implemented: determining a function of a target biological sequence according to the attribute information of the candidate entry, wherein the target biological sequence is the biological sequence corresponding to each of the candidate entries; calculating a similarity percentage between each of the target biological sequences; generating a relationship diagram of each of the target biological sequences according to the similarity percentage between each of the target biological sequences, wherein each node in the relationship diagram corresponds to a target biological sequence, and a color and/or a shape of each node in the relationship diagram is set according to a function of the corresponding target biological sequence; and displaying the relationship diagram as the retrieval result.

In an embodiment, when the computer program is executed by the processor, the following steps are further implemented: filtering candidate entries according to the attribute filter items input by a user to obtain a target entry, wherein the attribute filter items include one or more of similarity percentage, a species, a preparation method, a variant, a function, an inclusion, a homology, an involved drug, and an involved disease; obtaining the retrieval result according to the target entry.

Those of ordinary skill in the art may understand that all or part of the processes in the methods of the above embodiments can be implemented by instructing relevant hardware through a computer program, and the computer program may be stored in a non-volatile computer-readable storage medium, when the computer program is executed, the processes including the above-mentioned method embodiments may be implemented. Any reference to a memory, a storage, a database or other medium used in the various embodiments provided in this application may include non-volatile and/or volatile memory. Nonvolatile memory may include read only a memory (ROM), a programmable ROM (PROM), an electrically programmable ROM (EPROM), an electrically erasable programmable ROM (EEPROM), or a flash memory. Volatile memory may include a random access memory (RAM) or an external cache memory. By way of illustration and not limitation, RAM is available in various forms such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a memory bus (Rambus) direct RAM (RDRAM), a direct memory bus dynamic RAM (DRDRAM), and a memory bus dynamic RAM (RDRAM) and so on.

The technical features of the above embodiments can be combined arbitrarily. For the sake of brevity, all possible combinations of the technical features in the above embodiments are not described. However, as long as there is no contradiction in the combination of these technical features, it can be considered to be the range described in this specification.

The above-mentioned embodiments only represent several embodiments of this application, and the descriptions thereof are relatively specific and detailed, but should not be construed as a limitation on the scope of the invention patent. It should be noted that, for those skilled in the art, without departing from the concept of this application, several modifications and improvements can be made, which all belong to the protection scope of this application. Therefore, the scope of protection of the patent of this application shall be subject to the appended claims.

What is claimed is:

1. A method for constructing a database, wherein the database is a biological sequence database, applied to a searching engine and providing a user with any one of biological sequence retrieval and biological sequence attribute retrieval, and the method comprises:
  obtaining, by a server, a target document, the target document being a document in a biology field;
  extracting, by the server, a biological sequence and attribute information in the target document by using a deep learning model;
  associating, by the server, a document identifier of the target document with a corresponding biological sequence and the attribute information to obtain an entry; and
  constructing, by the server, a database using the entry,
  wherein the constructing, by the server, the database using the entry comprises:
  analyzing, by the server, technical terms and/or attribute information in the biological field to obtain association information, wherein the attribute information comprises one or more of similarity percentage between biological sequences, a species, a preparation method, a variant, a function, an inclusion, a homology, an involved drug, and an involved disease, the association information comprises association information about entries of different words expressing the same or similar meanings in the biology field, association information about entries containing part or all of the attribute information, and/or association level of association information; and
  performing, by the server, association processing on the entry according to the association information, and storing the entry in a database to obtain a biological sequence database, wherein the biological sequence database is configured to provide at least one candidate entry for the biological sequence and/or the attribute information when the user conducts a search; determine a function of a target biological sequence according to the attribute information of the at least one candidate entry, wherein the target biological sequence is a biological sequence corresponding to each candidate entry; calculate a similarity percentage between each of the target biological sequences; generate a relationship diagram of each of the target biological sequences according to the similarity percentage between each of the target biological sequences, wherein each node in the relationship diagram corresponds to a target biological sequence, and a color and/or a shape of each node in the relationship diagram is set according to a function of the corresponding target biological sequence; the candidate entry comprises: an exact matching entry corresponding to the biological sequence and/or the attribute information, and an association matching entry associated with the exact matching entry; the association matching entry comprises: an entry with different words expressing the same or similar meaning in the biological field as those in the exact matching entry; an entry with part or all attribute information as those in the exact matching entry, corresponding to a biological sequence different from the biological sequence.

2. The method according to claim 1, wherein the obtaining the target document comprises:
  obtaining a document from a data source to form a document set; and
  obtaining the target document from the document set according to a preset condition.

3. The method according to claim 2, wherein obtaining the target document from the document set according to the preset condition comprises:
  determining document types of documents in the document set;
  determining a filtering rule of a corresponding target document according to a difference between the document types, wherein filtering rules corresponding to different document types are different; and
  filtering documents of corresponding document types using the filtering rule to obtain the target document,
  wherein determining the document types of documents in the document set comprises:
  performing text recognition on documents in the document set to obtain text information contained in the documents; and
  determining the document types of documents in the document set according to a preset keyword contained in the text information.

4. The method according to claim 3, wherein the document types of documents in the document set comprise at least one of patent documents and non-patent documents.

5. The method according to claim 1, wherein the target document is a patent document,
  extracting the biological sequence and the attribute information in the target document comprises:
  extracting the biological sequence and the attribute information in claims and/or other parts of the patent document, wherein the other parts are parts of the patent document other than the claims.

6. The method according to claim 5, wherein the extracting the biological sequence and the attribute information in claims and/or other parts of the patent document comprises:
  obtaining a corresponding claim tree according to a claim structure of each patent document; and
  identifying an identical sequence in each of the claims in the corresponding patent document through the claim tree and biological technical terms.

7. The method according to claim 1, wherein the biological sequence database is further configured to:
  generate a map label for each of the target biological sequences according to the similarity percentage between target biological sequences and the biological sequence;
  determine a relative locational relationship between the map label of each of the target biological sequences and a map label of a query sequence according to the similarity percentage; and
  generate a biological sequence map according to the map label of each of the target biological sequences, the map label of the query sequence, and the relative locational relationship between the map label of each of the target biological sequences and the map label of the query sequence; and displaying the biological sequence map as a retrieval result.

8. The method according to claim 1, wherein if a retrieval result type selected by the user is a new field view of sequence similarity, the biological sequence database is further configured to:
  generate a scatter diagram according to the candidate entry, wherein an origin of the scatter diagram is a relevant species obtained according to the attribute information of the candidate entry, an X-axis of the scatter diagram is a number of biological sequences involved in the relevant species, and a Y-axis of the scatter diagram is a number of patents involved in the relevant species; and display the scatter diagram as the retrieval result.

9. The method according to claim 8, wherein the biological sequence database is further configured to:

calculate an average of the similarity percentages between the biological sequences involved in each of the relevant species; and set a color and/or a shape of each dot in the scatter diagram according to the average of the similarity percentages.

10. The method according to claim 1, wherein if a retrieval result type selected by the user is a genome view, the biological sequence database is further configured to:

determine a relevant gene sequence according to the attribute information of the candidate entry;

count the number of patents for each segment in a relevant genome, each segment in the relevant genome corresponding to a sequence;

generate a bar graph using the relevant gene sequence and the number of patents of each segment in the relevant genome; and display the bar graph as a retrieval result.

11. The method according to claim 1, wherein if a retrieval result type selected by the user is an inclusion view, the biological sequence database is further configured to:

determine a plurality of relevant inclusions according to the attribute information of the candidate entry;

obtain a first area curve graph according to a number of each of the relevant inclusions appearing in a first preset location of the corresponding target document and locations of the relevant inclusions in a genome of a target species;

obtain a second area curve graph according to a number of each of the relevant inclusions appearing in a second preset location of the corresponding target document and locations of the relevant inclusions in the genome of the target species; and overlay the first area curve graph and the second area curve graph to obtain a retrieval result.

12. The method according to claim 1, wherein the biological sequence database is further configured to:

filter the candidate entries according to attribute filter items input by the user to obtain a target entry, wherein the attribute filter items comprise one or more of the similarity percentage, the species, the preparation method, the variant, the function, the inclusion, the homology, the involved drug, and the involved disease; and obtain a retrieval result according to the target entry.

13. The method according to claim 1, wherein the biological sequence database is further configured to:

output a relevant biological sequence comprising at least one attribute according to the attribute information; and label a relevancy dimension of each of the relevant biological sequences according to an associated number of each of the relevant biological sequences and the attribute information.

* * * * *